Patented Nov. 23, 1943

2,335,089

UNITED STATES PATENT OFFICE 2,335,089

METHOD OF PRESERVING RUBBER

Robert L. Sibley, Nitro, W. Va., assignor to Monsanto Chemical Company, St. Louis, Mo., a corporation of Delaware No Drawing. Application November 27, 1940, Serial No. 367,449

14 Claims. (Cl. 260—810)

The present invention relates to the art of rubber manufacture, and particularly relates to rubber compositions which resist deterioration due to aging or to exposure to the atmosphere. It has long been known that such deterioration can be greatly retarded by treating the rubber before or after vulcanization with certain substances known as age-resisters or antioxidants. One object of this invention is to provide a superior class of antioxidants for rubber.

The age-resisting characteristics of a vulcanized rubber product can be readily ascertained by subjecting samples of the vulcanized product in a bomb to the action of air or oxygen under elevated pressure. The aged rubber samples are then examined and tested and the test data compared with the results obtained on testing the unaged rubber samples. The deterioration in properties effected as a result of the oxidation treatment is indicative of the result that would normally be expected of that particular stock during actual service. Such a test is known as the Bierer-Davis aging test and produces an effect on a vulcanized rubber stock comparable with that resulting from several years of natural aging of the rubber depending upon the condition of the test.

My prior application, Serial No. 199,847, filed April 4, 1938, of which the instant application is a continuation in part, discloses that nuclear hydrocarbon substituted dihydric phenols comprise a valuable class of antioxidants and includes within said class compounds in which the nucleus is additionally substituted. In accordance with the present invention it has been discovered that dihydric phenols belonging to the aforementioned class comprise a superior group of antioxidants. More particularly it has been discovered that nuclear hydrocarbon substituted ortho dihydric phenols are more powerful rubber antioxidants than the corresponding meta and para substituted bodies and therefore constitute an exceptionaly valuable group. Other nuclear substituents may be present but no group more reactive than a halogen substituent.

The new and superior group of antioxidants may be represented by the general formula

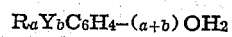

where the hydroxy groups are linked to vicinal carbon atoms and where R is a hydrocarbon radical containing less than eight carbon atoms and Y is a member of a group consisting of hydrogen and halogen atoms, $a$ and $b$ being integers whose sum is less than five.

While the number and position of the hydroxy groups are exceedingly important obviously the other substituents in the molecule also influence antioxidant activity. For example somewhat enhanced action is exhibited by ortho dihydric phenols containing a single hydrocarbon substituent, presumably para to a hydroxy group. Again a halogen substituent may be present but no more reactive group such as strongly acid or basic groups as for example carboxyl and amino groups since they tend to upset the cure and in the case of the latter discolor the rubber. In this connection the compounds of this invention are generally resistant to discoloration and are therefore useful in the manufacture of white rubber products. Accordingly in the preferred aspects of the invention, there is employed a compound possessing the structure

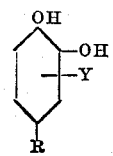

where R is selected from a group consisting of benzyl and alkyl hydrocarbon radicals containing more than one but less than six carbon atoms and Y is a member of a group consisting of hydrogen and halogen atoms.

Typical examples of the preferred class of antioxidants comprise di tertiary amyl catechol, diethyl catechol, di-propyl catechol, di tertiary butyl catechol, di secondary butyl catechol, di secondary amyl catechol, ethyl phenyl catechol, dibenzyl catechol, mono phenyl catechol, cyclohexyl catechol, but preferably mono alkyl or benzyl substituted catechols as for example p-tertiary butyl catechol, p-tertiary amyl catechol, mono secondary butyl catechol, mono iso amyl catechol, mono amyl mono chlor catechol, mono benzyl catechol, mono ethyl catechol, mono iso-propyl catechol, mono phenyl catechol, hexyl catechol and equivalents and analogues thereof.

The preferred class of antioxidants or age-resisters are obtainable in a variety of ways as for example by introducing one or more hydrocarbon constituents into an ortho dihydric phenol and if desired the compound so produced may be halogenated under such conditions that halogen is introduced into the nucleus and the halogenated compound employed as a rubber antioxidant. Obviously one or more hydrocarbon constituents may be introduced into an ortho dihydric phenol which already carries a halogen substituent. Those compounds of the present invention exemplified by the alkyl ortho dihydric phenols were found to be readily obtainable by treating catechol with any of the usual alkylating agents as for example an alkyl or aralkyl halide, an alkyl or aralkyl hydroxide or an olefine, usually in the presence of a suitable catalyst. The chemical literature describes a variety of reactions which may be employed to produce compounds of the type herein described and numerous variations of each method. It appears that in general the entering group substitutes in the para position and it is therefore believed that the antioxidants hereinafter described in connection with specific embodiments of the invention are para substituted bodies. However, the present invention is limited neither to a theory of structure nor a particular method of preparation.

The following is a specific illustration of one means by which the preferred class of compounds are obtainable and is in nowise limitative of the invention.

Substantially 110 parts by weight (substantially one molecular proportion) of catechol was heated to substantially 180° C. and 126.5 parts by weight of benzyl chloride was added dropwise to the heated catechol. The mixture was then refluxed for two hours at the end of which time the temperature had risen to 200-205° C. The reaction mixture containing unreacted catechol, benzyl catechol and dibenzyl catechol was placed in an evaporating dish and heated on a steam bath to remove hydrogen chloride. Unreacted catechol was removed by distilling the crude reaction mixture until a vapor temperature of 160° C. at 5 mm. pressure, was reached. The second fraction comprising the desired benzyl catechol distilled from 160° C. to 200° C. at 5 mm. pressure, the bulk of the material distilling at substantially 186-189° C./5 mm. The dibenzyl catechol distilled above 200° C./5 mm.

It is obvious that the procedure described above may be widely varied. For example the proportions of the reactants may be varied. Thus, sufficient benzyl catechol may be employed so as to leave substantially no unreacted catechol or the unreacted catechol may be removed by washing the crude reaction mixture with water. The reaction temperature may be varied within wide limits, thereby producing a greater or a less proportion of dibenzyl catechol in the final product. Where convenient or desirable the crude reaction mixture may be employed as an antioxidant for rubber with highly efficacious results. As hereinafter shown both mono benzyl and dibenzyl catechol are excellent antioxidants.

The following specific embodiments of the invention show the desirable antioxidant properties characteristic of the preferred class of materials and are to be understood as illustrating the invention and not limitative thereof.

Rubber stocks were compounded comprising

|  | Stock | | |
| --- | --- | --- | --- |
|  | A | B | C |
|  | Parts by weight | Parts by weight | Parts by weight |
| Pale crepe rubber | 100 | 100 | 100 |
| Zinc oxide | 60 | 60 | 60 |
| Lithopone | 20 | 20 | 20 |
| Sulfur | 2 | 2 | 2 |
| Benzothiazyl thiol benzoate | 0.825 | 0.725 | 0.825 |
| Diphenyl guanidine phthalate | 0.675 | 0.675 | 0.675 |
| Paraffin | 0.25 | 0.25 | 0.25 |
| Amyl mono chlor catechol | 1.0 | | |
| Cyclohexyl catechol | | 1.0 | |
| Dibenzyl catechol | | | 1.0 |

The rubber stocks so compounded were vulcanized in a press at the temperature of twenty pounds steam pressure per square inch and the modulus and tensile properties of the cured rubber stocks compared with those of the same cured stocks which had been aged in an air bomb at 250° F. and eighty pounds air pressure per square inch. The results are tabulated below:

Table I

| Cure | | Hours air bomb aged | Stock | Modulus of elasticity in lbs./in.$^2$ at elongations of— | | Tensile at break in lbs./in.$^2$ | Ult. elong., per cent |
| --- | --- | --- | --- | --- | --- | --- | --- |
| Time in mins. | Steam press. | | | 300% | 500% | | |
| 30 | 20 | 0 | A | 455 | 1,585 | 3,500 | 680 |
| 30 | 20 | 6 | A | 545 | 1,710 | 2,525 | 600 |
| 30 | 20 | 0 | B | 650 | 2,040 | 4,450 | 600 |
| 30 | 20 | 6 | B | 510 | 1,640 | 2,280 | 590 |
| 30 | 20 | 0 | C | 650 | 2,100 | 4,560 | 690 |
| 30 | 20 | 6 | C | 770 | 2,350 | 3,200 | 570 |
| 45 | 20 | 0 | A | 505 | 1,680 | 3,750 | 690 |
| 45 | 20 | 6 | A | 495 | 1,460 | 2,300 | 615 |
| 45 | 20 | 0 | B | 680 | 2,115 | 4,150 | 650 |
| 45 | 20 | 6 | B | 500 | 1,480 | 2,100 | 600 |
| 45 | 20 | 0 | C | 650 | 2,120 | 4,300 | 680 |
| 45 | 20 | 6 | C | 690 | 2,190 | 3,050 | 570 |

The above data show the desirable antioxidant properties of the preferred class of materials when incorporated in a typical whiter rubber stock. More particularly it is shown that a high proportion of the tensile strength is retained after aging.

The superiority of the ortho dihydric phenols containing a nuclear hydrocarbon substituent becomes strikingly apparent upon comparing the resistance to aging imparted to rubber by dihydric phenols containing the hydroxy groups in other positions. As further specific embodiments of the invention illustrating the superiority of the preferred materials a rubber base stock was compounded comprising

| | Parts by weight |
|---|---|
| Pale crepe rubber | 100 |
| Zinc oxide | 60 |
| Lithopone | 20 |
| Sulfur | 2 |
| Benzothiazyl thiol benzoate | 0.825 |
| Diphenyl guanidine phthalate | 0.675 |
| Paraffin | 0.25 |

To the base stock so compounded 1.0 part by weight of an antioxidant was added and the rubber stocks vulcanized in a press at the temperature of twenty pounds steam pressure per square inch. The cured rubber products were then artificially aged by heating for 4 hours in an air bomb substantially as described in connection with stocks A to C above. The tensile strengths of the aged rubber products were then compared to those of the base stock, i. e. containing no antioxidant, the results being tabulated in Table II. The figures are the ratios of the tensile strengths at break of the stocks containing an antioxidant to those containing no antioxidant. That is to say the base stock is arbitrarily taken as 100 and the tensiles of the protected stocks divided by the tensile of the base stock and multiplied by 100 to give a comparative rating.

*Table II*

| Antioxidant | Ratio of aged tensiles in— | |
|---|---|---|
| | 30 min. cure | 45 min. cure |
| None | 100 | 100 |
| Mono benzyl hydroquinone | 123 | 109 |
| Mono benzyl resorcinol | 125 | 118 |
| Mono benzyl catechol | 146 | 140 |
| Mono tertiary butyl resorcinol | 127 | 121 |
| Mono tertiary butyl catechol | 169 | 146 |
| Di tertiary butyl hydroquinone | 129 | 112 |
| Di tertiary butyl resorcinol | 140 | 134 |
| Di secondary butyl catechol | 145 | 144 |
| Di secondary amyl hydroquinone | 108 | 117 |
| Di secondary amyl catechol | 120 | 126 |
| Mono ethyl resorcinol | 119 | 123 |
| Mono ethyl catechol | 159 | 172 |
| Mono isopropyl catechol | 144 | 138 |
| Mono tertiary amyl catechol | 130 | 129 |

The above data show that the position of the hydroxy group has a significant effect on the antioxidant properties of nuclear substituted dihydric phenols and more particularly that the ortho position of the hydroxy groups results in enhanced antioxidant activity.

Typical white rubber stocks containing one of the preferred class of antioxidants as for example para tertiary butyl catechol, para tertiary amyl catechol, di secondary amyl catechol, mono benzyl catechol and amyl mono chlor catechol were exposed to ultra violet light and to the direct rays of Florida sunlight. The white rubber stocks containing the preferred antioxidants were found by the above tests to be resistant to discoloration.

From the specific examples hereinbefore set forth it is shown that rubber compositions containing small proportions of the preferred class of materials markedly resist the deteriorating influences of heat, oxidation and light.

Obviously practice of this invention is not limited to the specific compositions given above, such compositions being merely illustrative of the manner of employing the antioxidants or age-resisters of this invention. The antioxidants or age-resisters may be employed in different proportions than herein described and in conjunction with other vulcanizing agents than those specifically disclosed, for this invention is applicable generally to pure rubber or rubber compositions of the most varied nature. Furthermore, the preferred class of materials may be employed in rubber stocks in conjunction with other accelerators than those specifically shown with varying differences in tensile and modulus properties but still exhibiting the desirable properties of the class.

It is to be understood that the term "treating" as employed in the appended claims is used in general sense to include either the incorporating of the preferred class of materials into the rubber by milling or similar process, or their addition to the rubber latex before its coagulation, or the application thereof to the surface of a mass of crude or vulcanized rubber.

The present invention is limited solely by the claims attached hereto as part of the present specification.

What is claimed is:

1. The method of preserving a rubber which comprises treating a rubber with a nuclear substituted catechol wherein said substituents number less than three and are selected from a group consisting of halogen and hydrocarbon groups of less than eight carbon atoms at least one of them being a nuclear hydrocarbon group of less than eight carbon atoms.

2. The method of preserving a rubber which comprises treating a rubber with a nuclear substituted catechol possessing the structure

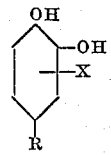

where R and X are alkyl hydrocarbon groups of less than six carbon atoms.

3. The method of preserving a rubber which comprises treating a rubber with a nuclear substituted catechol possessing the structure

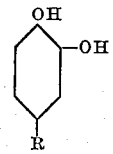

where R is a hydrocarbon group of less than eight carbon atoms.

4. The method of preserving india rubber which comprises treating india rubber with a nuclear substituted catechol containing at least one but less than three branched chain alkyl hydrocarbon groups of less than six carbon atoms but no other nuclear substituent.

5. The method of preserving india rubber which comprises treating india rubber with mono benzyl catechol.

6. The method of preserving india rubber which comprises treating india rubber with p-tertiary butyl catechol.

7. The method of preserving india rubber which comprises treating india rubber with p-ethyl catechol.

8. The vulcanized rubber product obtained by heating a rubber and sulfur in the presence of a nuclear substituted catechol wherein said substituents number less than three and are selected from a group consisting of halogen and hydrocarbon groups of less than eight carbon atoms at least one of them being a nuclear hydrocarbon group of less than eight carbon atoms.

9. The vulcanized rubber product obtained by heating a rubber and sulfur in the presence of a nuclear substituted catechol possessing the structure

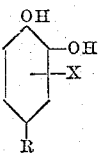

where R and X are alkyl hydrocarbon groups of less than six carbon atoms.

10. The vulcanized rubber product obtained by heating a rubber and sulfur in the presence of a nuclear substituted catechol possessing the structure

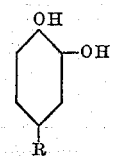

where R is a hydrocarbon group of less than eight carbon atoms.

11. The vulcanized rubber product obtained by heating india rubber and sulfur in the presence of a nuclear substituted catechol containing at least one but less than three branched chain alkyl hydrocarbon groups of less than six carbon atoms but no other nuclear substituent.

12. The vulcanized rubber product obtained by heating india rubber and sulfur in the presence of mono benzyl catechol.

13. The vulcanized rubber product obtained by heating india rubber and sulfur in the presence of p-tertiary butyl catechol.

14. The vulcanized rubber product obtained by heating india rubber and sulfur in the presence of p-ethyl catechol.

ROBERT L. SIBLEY.

CERTIFICATE OF CORRECTION.

Patent No. 2,335,089.                                November 23, 1943.

ROBERT L. SIBLEY.

It is hereby certified that error appears in the printed specification of the above numbered patent requiring correction as follows: Page 3, second column, line 23, after "rubber." insert the following:

> --The term "a rubber" is employed in the claims to define a vulcanizable plastic material which possesses high extensibility under load coupled with the property of forcibly retracting to approximately its original size and shape after the load is removed. Such products include, for example, india rubber, reclaimed rubber, balata, gutta percha and other natural or synthetic vulcanizable products which deteriorate upon aging whether or not admixed with fillers, pigments or accelerating agents.--; -- and that the said Letters Patent should be read with this correction therein that the same may conform to the record of the case in the Patent Office.

Signed and sealed this 28th day of March, A. D. 1944.

Leslie Frazer (Seal)                                    Acting Commissioner of Patents.